(12) United States Patent
Georgiou et al.

(10) Patent No.: US 10,413,977 B2
(45) Date of Patent: Sep. 17, 2019

(54) TEMPERATURE MANAGEMENT FOR A CRYOGENICALLY COOLED BORING TOOL

(71) Applicant: 5ME IP, LLC, Cincinnati, OH (US)

(72) Inventors: George Georgiou, Tecumseh (CA); Don Azzopardi, Wolverine Lake, MI (US)

(73) Assignee: 5ME IP, LLC, Cincinnati, OH (US)

( * ) Notice: Subject to any disclaimer, the term of this patent is extended or adjusted under 35 U.S.C. 154(b) by 0 days.

(21) Appl. No.: 15/775,419

(22) PCT Filed: Nov. 4, 2016

(86) PCT No.: PCT/US2016/060534
§ 371 (c)(1),
(2) Date: May 11, 2018

(87) PCT Pub. No.: WO2017/083192
PCT Pub. Date: May 18, 2017

(65) Prior Publication Data
US 2018/0345387 A1    Dec. 6, 2018

Related U.S. Application Data

(60) Provisional application No. 62/254,407, filed on Nov. 12, 2015.

(51) Int. Cl.
*B23B 51/06* (2006.01)
*B23Q 11/10* (2006.01)
*B23B 41/12* (2006.01)

(52) U.S. Cl.
CPC .......... *B23B 51/06* (2013.01); *B23Q 11/1023* (2013.01); *B23Q 11/1053* (2013.01);
(Continued)

(58) Field of Classification Search
CPC . B23B 51/06; B23Q 11/1023; B23Q 11/1053; Y10T 408/45
See application file for complete search history.

(56) References Cited

U.S. PATENT DOCUMENTS 4,757,307 A * 7/1988 Keramati ............... B23Q 11/10
340/680
5,901,623 A * 5/1999 Hong ..................... B23B 27/10
407/100
(Continued)

FOREIGN PATENT DOCUMENTS

CN    2778440 Y    5/2006
CN    103121121 A   5/2013
(Continued)

OTHER PUBLICATIONS

CN Search Report for CN Pat. App. No. 201680066321.9 filed on Nov. 4, 2016, received via email dated Jan. 7, 2019.
(Continued)

*Primary Examiner* — Eric A Gates
(74) *Attorney, Agent, or Firm* — Reising Ethington P.C.

(57) ABSTRACT

A cryogenically cooled boring tool design reduces the effect of cryogen coolant on a workpiece caused by coolant leakage and coolant exhaust. A tool body has a cartridge for holding a cutting tool insert and a coolant supply path through the tool body and the cartridge for supplying cryogenic coolant to the tool insert. A feed transfer tube connects the coolant supply path in the tool body to the coolant supply path in the cartridge. Insulating tubes line portions of the coolant supply paths in the tool body and the cartridge. The shrinkage rates of the feed transfer tube and the insulating tubes cause the press fit of the insulating tubes to tighten the seal between the insulating tubes and the feed transfer tube when cryogenic coolant flows through the
(Continued)

supply path. The exhaust ports on the tool for boiled-off cryogen remains outside of a workpiece bore.

14 Claims, 4 Drawing Sheets

(52) U.S. Cl.
CPC ........... *B23B 41/12* (2013.01); *B23B 2226/66* (2013.01); *Y10T 408/45* (2015.01)

(56) References Cited

U.S. PATENT DOCUMENTS

| | | | | |
|---|---|---|---|---|
| 6,637,984 | B2 * | 10/2003 | Murakawa | B23B 27/10 |
| | | | | 407/11 |
| 8,439,609 | B2 * | 5/2013 | Woodruff | B23C 5/109 |
| | | | | 407/11 |
| 10,124,412 | B2 * | 11/2018 | Harif | B23C 5/207 |
| 2003/0002936 | A1 | 1/2003 | Camozzi | |
| 2010/0239377 | A1 | 9/2010 | Morrison et al. | |
| 2010/0272530 | A1 | 10/2010 | Rozzi et al. | |
| 2015/0132074 | A1 | 5/2015 | Boissonnet et al. | |

FOREIGN PATENT DOCUMENTS

| | | | |
|---|---|---|---|
| CN | 203649438 | U | 6/2014 |
| DE | 3310034 | | 9/1984 |
| DE | 202009002366 | | 7/2010 |
| DE | 102011003714 | | 6/2012 |
| EP | 100376 | A2 * | 2/1984 |
| EP | 599393 | A1 * | 6/1994 |
| JP | H0825109 | A | 1/1996 |
| JP | 2001047304 | A * | 2/2001 |
| JP | 2005225208 | A | 8/2005 |
| WO | 0149448 | A2 | 7/2001 |
| WO | 2014207747 | A2 | 12/2014 |
| WO | 2015117079 | A1 | 8/2015 |

OTHER PUBLICATIONS

International Search Report and Written Opinion for EP Pat. App. No. 16864803.8completed on Oct. 18, 2018.
International Search Report and Written Opinion of the International Searching Authority for International Patent Application No. PCT/US2016/060534 filed on Nov. 4, 2016, dated Jan. 13, 2017, dated Jan. 16, 2017.
International Preliminary Report on Patentability for International Patent Application No. PCT/US2016/060534 filed on Nov. 4, 2016, dated May 15, 2018. 6 pages.

* cited by examiner

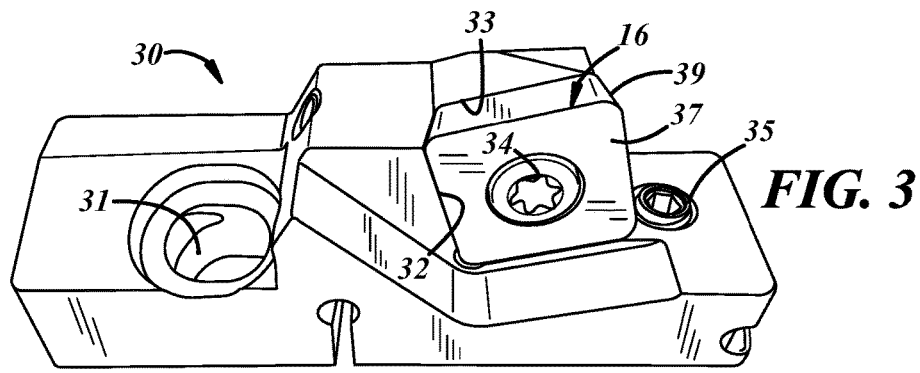
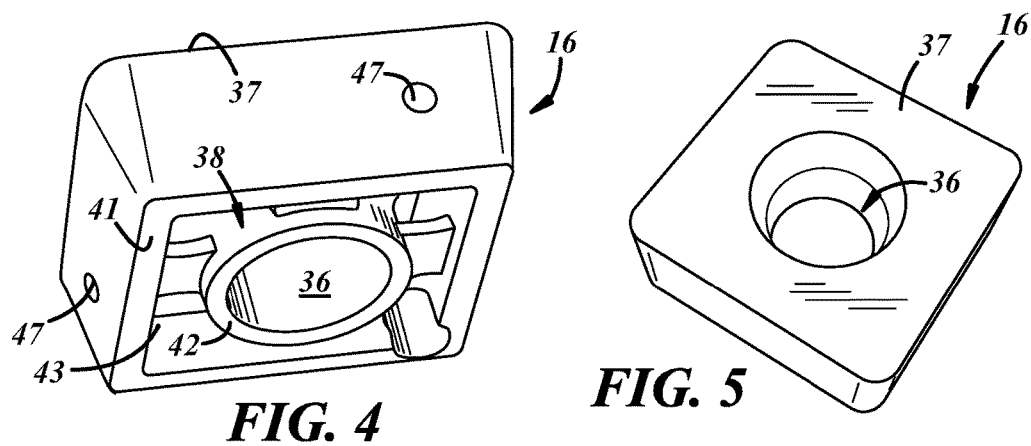
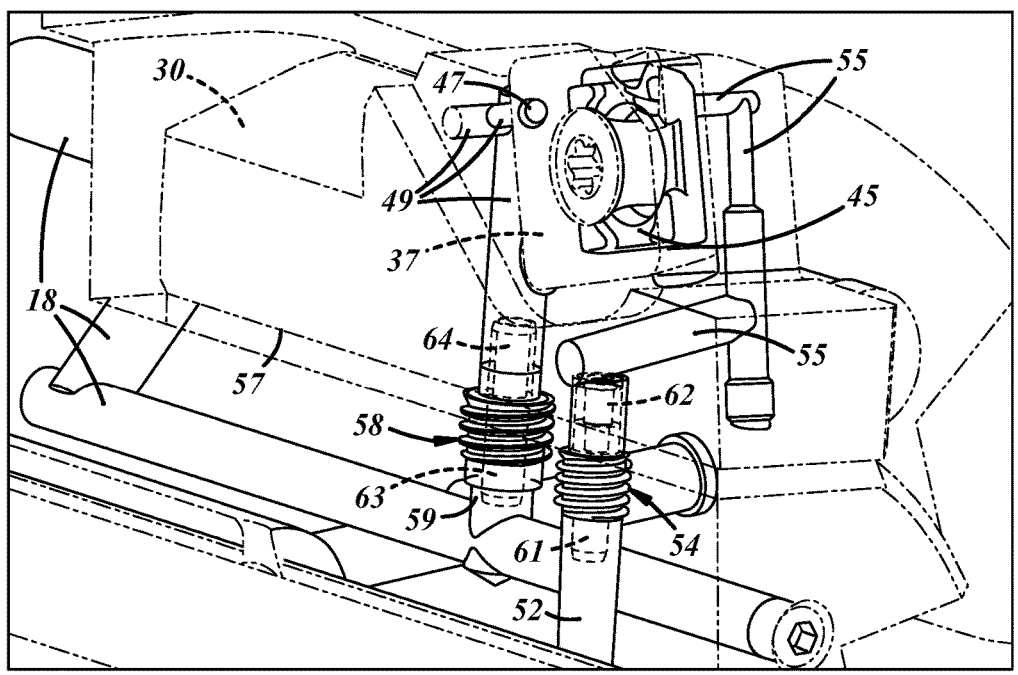

TEMPERATURE MANAGEMENT FOR A CRYOGENICALLY COOLED BORING TOOL

CROSS-REFERENCE TO RELATED APPLICATIONS

This patent application claims the benefit of priority from Patent Cooperation Treaty patent application number PCT/US2016/060534 filed on Nov. 4, 2016, and U.S. Provisional patent application No. 62/254,407 filed on Nov. 12, 2015, the entire contents of which are herein incorporated by reference.

FIELD

The device relates to temperature management for a cryogenically cooled boring tool to reduce thermal related bore geometry distortion of a workpiece.

BACKGROUND

The application of a cryogenic coolant to a cutting tool to reduce cutting edge wear has proven to be advantageous in milling, turning and other metal cutting processes. It has been found that using a cryogenically cooled cutting tool in a boring operation such as cylinder boring can result in deformation of the bore caused by cryogenic coolant from the tool coming into contact with the cylinder walls caused by coolant that is exhausted from the tool to atmosphere, and leakage of cryogenic coolant from the coolant flow path within the tool. With regard to leakage in the coolant flow path within the tool body, it is difficult to seal the interface between the cutter body and the adjustable cartridge which holds the cutting insert.

It would be advantageous to develop a cutting tool for boring operations using cryogenic coolant that did not exhaust the coolant into the bore.

It would also be advantageous to develop a cutting tool for boring operations using cryogenic coolant in which the leakage of coolant from the coolant flow path within the tool is minimized.

BRIEF DESCRIPTION OF THE DRAWINGS

FIG. 3 is a perspective view of a cartridge which holds a cutting tool insert.

FIG. 4 is a perspective view of the bottom face of a cutting tool insert.

FIG. 5 is a perspective view of the top face of an insert.

FIG. 6 is a detail perspective view partially in section of the front portion of a boring tool.

DESCRIPTION OF THE PREFERRED EMBODIMENT

Figure 1:
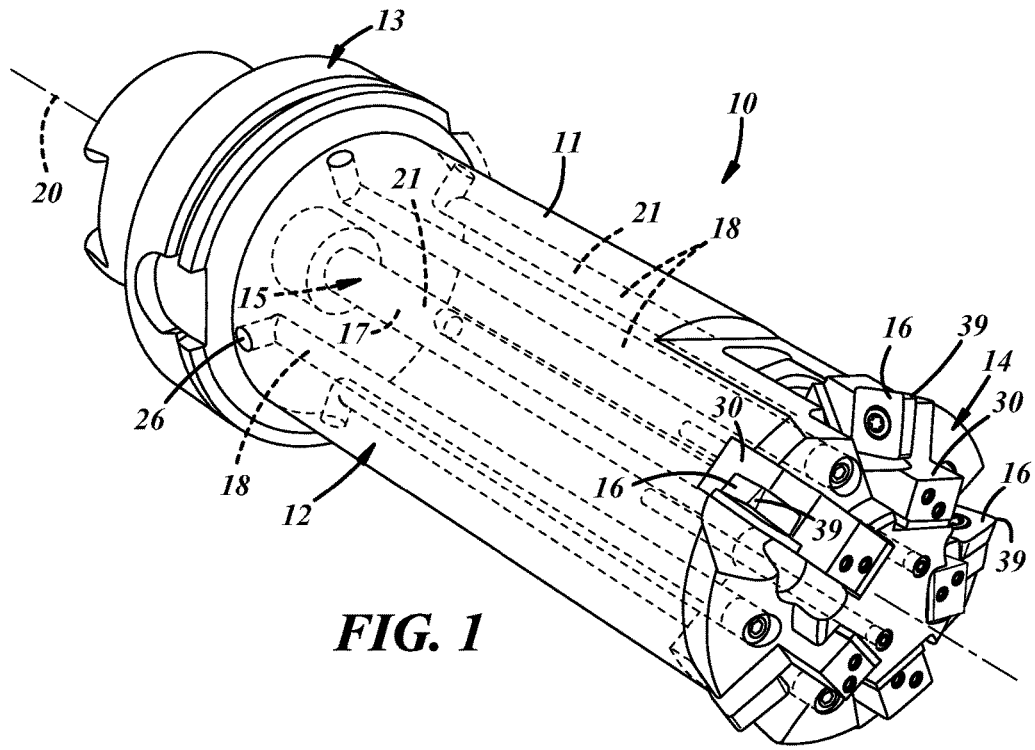
FIG. 1 is a perspective end view of the boring tool.

FIG. 1 is a perspective end view of the front end of a boring tool generally designated by the reference numeral 10. The boring tool 10 may have a tool body 11 with a generally cylindrical outer surface 12, a shank end 13 for coupling the tool to a rotary drive, and a front end 14 which engages a workpiece. The front end 14 may support a plurality of cutting tool inserts 16. The boring tool 10 may have a coolant flow path 15 within the tool that includes a coolant supply path 17 in the tool body extending from the shank end 13 to the front end 14 of the boring tool 10 for conducting coolant to the cutting tool inserts 16, and a plurality of internal exhaust paths 18 for conducting coolant from inserts 16 back to the shank end 13. The coolant flow path 15 also includes radial feed paths 52 in the tool body, and a cartridge feed paths 55 in cartridges 30 in which the cutting tool inserts 16 are mounted as described more fully below.

The coolant supply path 17 may be positioned along the rotary axis 20 of the tool, and the internal exhaust paths 18 may be positioned between the supply path 17 and outer surface 12 of the tool. The internal exhaust paths 18 may be spaced from the outer surface 12 of the tool body 11 to reduce the cooling effect of the coolant on the outer surface 12 of the tool body 11. The coolant that is used may be a cryogenic coolant such as liquid nitrogen (LN2), or any other cryogenic coolant used in industrial machining operations. Both the coolant supply path 17 and the internal exhaust paths 18 may be lined with a cryogenically compatible thermally insulating material 21 such as plastic. In the preferred embodiment, tubes or linings of polytetraflourethylene (PTFE) were used, but other materials may be used. The boring tool 10 may have a plurality of cutting tool inserts 16 spaced around the outer circumference of the front end 14 of the tool. Each of the inserts 16 may have an active cutting edge 39 which engages a workpiece during a cutting operation. In the embodiment shown, there are five cutting tool inserts 16, but more or fewer cutting tool inserts 16 may be provided as desired.

Figure 2:
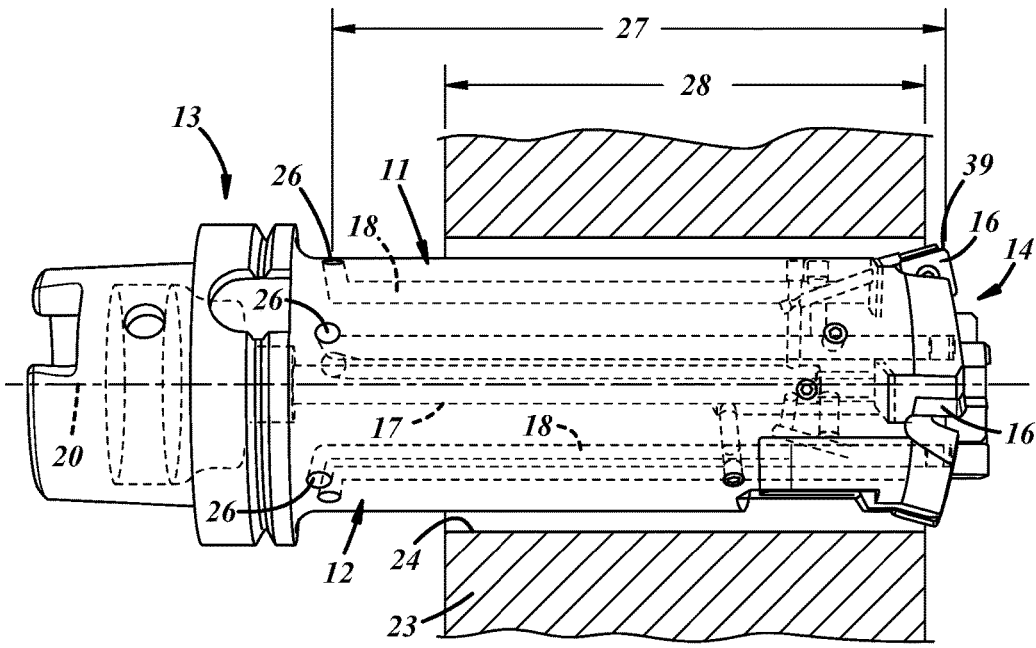
FIG. 2 is a side view of the boring tool of FIG. 1 in a cylindrical bore of a workpiece.

FIG. 2 is a side view of the boring tool of FIG. 1 in a cylindrical bore such as in the cylinder bore 24 of workpiece 23 such as an internal combustion engine. Each internal exhaust path 18 is coupled to an exhaust port 26 formed on the outer surface 12 of the cutting tool body 11. The exhaust ports 26 are positioned on the cutting tool body 11 remote from the cutting tool inserts 16 so that the ports 26 are outside of the cylindrical bore 24 when the active cutting edges 39 of the cutting tool inserts 16 on the front of the tool body 11 have passed through the cylinder bore 24 and are outside of out of the cylindrical bore 24 as shown. Thus, the boring tool 10 is designed so that the axial distance 27 between the exhaust ports 26 and the active cutting edges of the cutting tool inserts 16 is greater than the depth 28 of the bore 24 in which the tool 10 will be used.

FIG. 3 is a detail view of a cartridge 30 which holds a cutting tool insert 16. The cartridge 30 may have one or more mounting holes 31 which may receive a cartridge mounting bolt, not shown, for mounting the cartridge 30 in the front end 14 of a tool, and a radial adjusting screw 35 which flexes the cartridge 30 to adjust the cutting diameter of the tool 10 by adjusting the position of the active cutting edge 39 of the cutting tool insert 16. The cartridge 30 may be formed with a pocket 32 which receives the cutting tool insert 16. The cutting tool insert 16 may be held against the back wall 33 of the pocket 32 by an insert mounting bolt 34. The insert mounting bolt 34 may pass through an insert mounting bolt hole 36 that may extend between the top face 37 of the insert and the bottom face 38 of the insert 16.

FIG. 4 is a perspective view of the bottom face 38 of the cutting tool insert 16. The bottom face 38 may have a raised outer rim 41 which extends around the outer periphery of the insert 16, and a raised inner rim 42 which surrounds the insert mounting bolt hole 36. The raised outer rim 41 and the raised inner rim 42 lie in a common plane. A channel 43 may be formed between the raised outer rim 41 and the raised inner rim 42 of the insert 16. When the cutting tool insert 16 is mounted in the cartridge 30, the raised outer rim 41 and the raised inner rim 42 of the insert is against the back wall 33 of the pocket 32, and the channel 43 and the back wall 33 form a coolant cavity 45 as described more fully below. Insert exhaust ports 47 may be formed on two sides of the insert 16. The insert exhaust ports 47 communicate with the channel 43 formed on the bottom face 38 of the insert and may be aligned with a cartridge exhaust path 49 formed in the cartridge 30 when the insert 16 is mounted in the cartridge pocket 32.

FIG. 5 is a perspective view of the top face 37 of the cutting tool insert 16 of FIG. 4.

Figure 7:
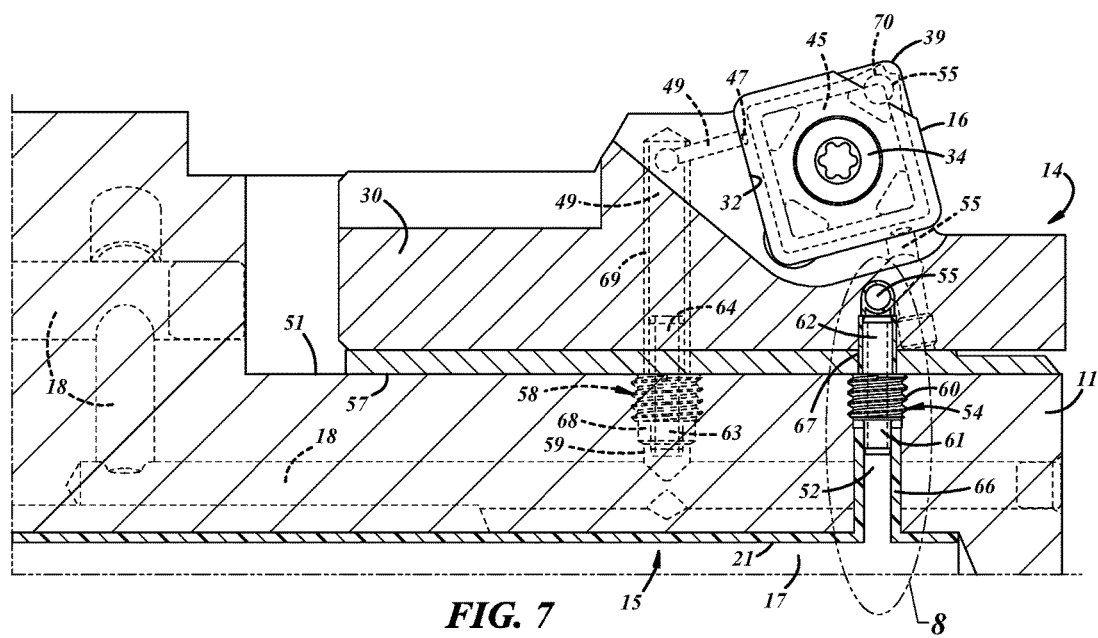
FIG. 7 is a side sectional view of the front portion of a boring tool.

FIG. 6 is a front perspective view of a boring tool 10 partially in section showing the upper half of the front end 14 of the tool, and FIG. 7 is a side sectional view of the upper half of the front end 14 of the tool. A cartridge 30 is mounted on a seating surface 51 on the front end 14 of the tool body 11, and a cutting tool insert 16 is mounted in the cartridge 30. The coolant flow path 15 includes the axial coolant supply path 17 and the radial feed path 52 in the tool body, and a cartridge feed path 55 in the cartridge 30. The radial feed path 52 in the tool body 11 terminates at the seating surface 51. A feed transfer tube 54 may be inserted in the upper portion of the radial feed path 52 and may join the radial feed path 52 with a cartridge feed path 55 formed in the cartridge 30. The cartridge feed path 55 may deliver coolant to the coolant cavity 45 in the insert 16 as described more fully below. The feed transfer tube 54 may have a portion 62 that extends into the cartridge 30 and may have a threaded portion 60 that is threaded into the tool body 11.

A cartridge exhaust path 49 is formed in the cartridge 30 and may extend from the pocket 32 to the bottom surface 57 of the cartridge 30. An exhaust transfer tube 58 joins the cartridge exhaust path 49 with a radial exhaust path 59 that extends from the seating surface 51 formed in the tool body 11 to the internal exhaust path 18 formed in the tool body 11. The internal exhaust path 18 may extend in an axial direction along the boring tool 10 toward the shank end 13 of the tool and may communicate with one of the exhaust ports 26 as shown in FIGS. 1 and 2. The internal exhaust paths 18 may be lined with a cryogenic compatible insulator to minimize the heat transfer between the coolant in the internal exhaust path 18 and the tool body 11. The exhaust ports 26 may be positioned on the outer surface 12 of the tool body so that they remain outside of the cylindrical bore 24 of a workpiece 23 when the tool body 11 is fully inserted into the bore 24 as shown in FIG. 2.

Figure 8:
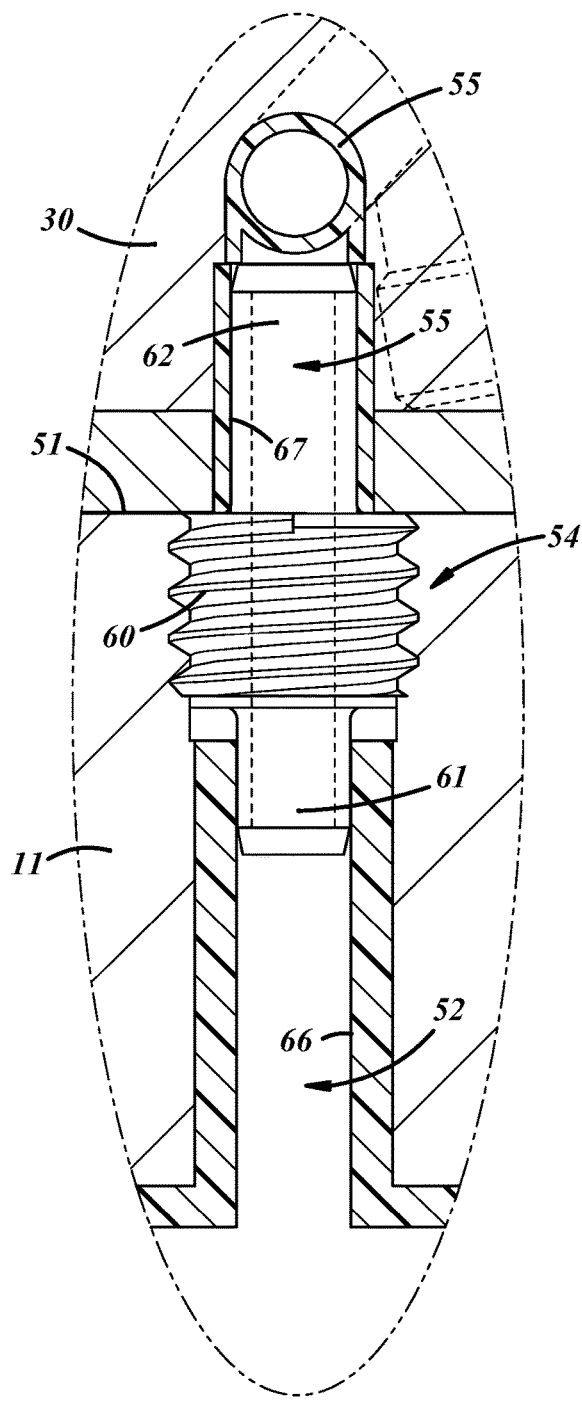
FIG. 8 is a detail view of the section 8 designated in FIG. 7.
Figure 9:
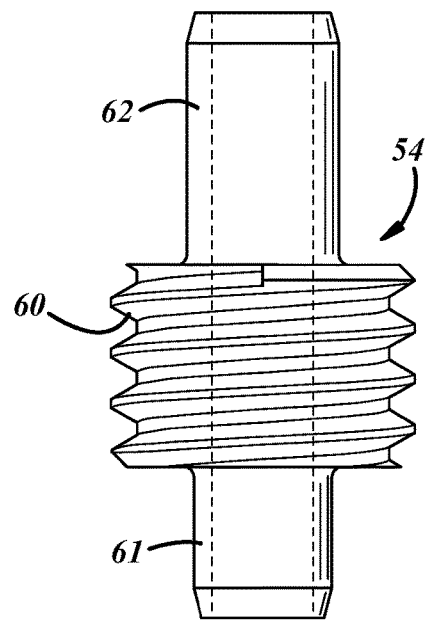
FIG. 9 is a detail view of the connecting tube shown in FIG. 8.

As best seen in FIGS. 8 and 9, the feed transfer tube 54 may have a threaded portion 60 and may be screwed into the tool body 11. The feed transfer tube 54 may have a nipple on either end. A first nipple 61 may be press fit into a first insulating tube 66 which lines the radial feed path 52, and a second nipple 62 may be press fit into a second insulating tube 67 which may line the cartridge feed path 55. The feed transfer tube 54 may be formed of metal, and in the preferred embodiment, stainless steel was used. Other materials or metals may be used. The first and second insulating tubes 66 and 67, respectively, may comprise cryogenically compatible thermally insulating material such as plastic or nylon. In the preferred embodiment, PTFE tubes were used. Other materials may be used.

Referring back to FIGS. 6 and 7, the exhaust transfer tube 58 may communicate on a first end with the radial exhaust path 59 in the tool body 11, and on a second end with a cartridge exhaust path 49 formed in the cartridge 30. The exhaust transfer tube may be formed of metal and similar in construction to the feed transfer tube 54, but may be sized differently to accommodate the flow requirements of the exhaust flow. The exhaust transfer tube 58 may be threaded and may be screwed into the tool body 11. The exhaust transfer tube 58 may have a nipple on either end. A first nipple 63 may be press fit into a third insulating tube 68 which lines the radial exhaust path 59, and a second nipple 64 may be press fit into a fourth insulating tube 69 which lines the cartridge exhaust path 49. The third and fourth insulating tubes 68 and 69, respectively, may comprise cryogenically compatible thermally insulating material such as plastic or nylon. In the preferred embodiment, PTFE tubes were used. Other materials may be used.

The coolant feed path may extend from the coolant supply path 17 to the coolant cavity 45 formed by the cutting tool insert 16, and may include the radial feed path 52 and the cartridge feed path 55 that extends from the end of the feed transfer tube 54 through the cartridge 30 to a feed outlet 70 in the back wall 33 of the cartridge pocket 32. The feed outlet 70 is aligned with the coolant cavity 45 that is formed between the raised outer rim 41 and the raised inner rim 42 on the bottom face 38 of the insert 16.

In use, cryogenic coolant may be supplied from an external supply to the coolant supply path 17 in the tool body 11. From the coolant supply path 17 the cryogen may enter the radial feed line 52 and the feed transfer tube 54 mounted in the tool body 11. From the feed transfer tube 54 the cryogen may enter the cartridge feed path 55. The coolant from the cartridge feed path 55 may enter the coolant cavity 45 on the bottom face 38 of the insert 16, cooling the insert 16 and especially the cutting edge 39 of the insert that is in contact with the workpiece 23. The exhaust produced by the boiling-off of cryogen coolant in the coolant cavity 45 may be directed through the cartridge exhaust path 49 to the exhaust transfer tube 58 in the cutting tool body 11, to the exhaust path 18, and to the exhaust ports 26 which exhaust the coolant to atmosphere. The exhaust ports 26 as shown in FIG. 2 are outside of the workpiece bore 24 to maintain an atmospheric air barrier between the cryogenic exhaust flow from the ports and the workpiece 23.

The flow of cryogenic coolant through the flow path in the tool body 11 cools the components that form the flow path, including the insulating tubes 66-69 that are mated to either end of the transfer tubes 54 and 58. As the insulating tubes 66-69 shrink, it tightens the seal between the first and second insulating tubes 66 and 67 and the feed transfer tube 54, and between the third and fourth insulating tubes 68 and 69 and the exhaust transfer tube 58, because the shrinkage of the insulating tubes 66-69 is greater than the shrinkage of the metal transfer tubes 54 and 58. The shrinking of the insulating tubes 66-69 on the transfer tubes 54 and 58 creates a leak proof seal due to the shrink rate differences of the mating parts. By locating the exhaust ports 26 outside of the cylinder bore 24, directing the exhaust ports 26 away from workpiece material 23, and preventing the leakage of cryogen in the coolant supply path and the internal exhaust path where those paths cross between the tool body 11 and the cartridge 30, the effect of the cryogen coolant on the bore 24 is reduced, maintaining the roundness, straightness and cylindricity of a cylindrical bore 24 in a workpiece.

Having thus described the invention, various modifications and alterations will be apparent to those skilled in the art, which modifications and alterations are intended to be within the scope of the invention as defined by the appended claims.

The invention claimed is:

1. A cryogenically cooled boring tool which reduces the effect of cryogen coolant on a workpiece caused by coolant leakage and coolant exhaust, the boring tool comprising:
   a tool body having at least one cartridge for holding a cutting tool insert;
   a coolant flow path within the tool body for supplying cryogenic coolant to the cutting tool insert and at least one internal exhaust path that is internal to the tool body for conducting coolant from the cutting tool insert to atmosphere;
   the coolant flow path comprising a feed path in the cutting tool body and a feed path in the cartridge;
   a feed transfer tube for connecting the feed path in the cutting tool body with the feed path in the cartridge; and
   a first insulating tube lining at least a portion of the feed path in the cutting tool body and a second insulating tube lining at least a portion of the feed path in the cartridge, wherein the feed transfer tube is press fit into the ends of the first and second insulating tubes, and wherein the shrinkage rates of the feed transfer tube and the first and second insulating tubes cause the press fit of the said insulating tubes to tighten the seal between the said insulating tubes and the feed transfer tube when cryogenic coolant flows through the coolant flow path to prevent leakage of cryogenic coolant from the coolant flow path.

2. The cryogenically cooled boring tool of claim 1 further comprising:
   a first nipple on the feed transfer tube, wherein the first nipple is press fit into the first insulating tube lining at least a portion of the feed path in the tool body; and,
   a second nipple on the feed transfer tube, wherein the second nipple is press fit into the second insulating tube lining at least a portion of the feed path in the cartridge.

3. The cryogenically cooled boring tool of claim 2 further comprising:
   a threaded portion on the feed transfer tube, wherein the threaded portion is threaded into the tool body.

4. The cryogenically cooled boring tool of claim 1 further comprising:
   the internal exhaust path comprising a coolant exhaust path in the cutting tool body and a cartridge exhaust path in the cartridge;
   an exhaust transfer tube for connecting the coolant exhaust path in the cutting tool body to the cartridge exhaust path in the cartridge;
   a third insulating tube lining at least a portion of the internal exhaust path in the tool body; and,
   a fourth insulating tube lining at least a portion of the cartridge exhaust path in the cartridge, wherein the exhaust transfer tube is press fit into the ends of the third and fourth insulating tubes, and wherein the shrinkage rates of the exhaust transfer tube and the third and fourth insulating tubes cause the press fit of the said insulating tubes to tighten the seal between the said insulating tubes and the exhaust transfer tube when cryogenic coolant flows through the coolant exhaust path to prevent leakage of cryogenic coolant from the internal exhaust path.

5. The cryogenically cooled boring tool of claim 4 further comprising:
   a first nipple on the exhaust transfer tube, wherein the first nipple is press fit into the third insulating tube lining at least a portion of the internal exhaust path in the tool body; and,
   a second nipple on the exhaust transfer tube, wherein the second nipple is press fit into the fourth insulating tube lining at least a portion of the cartridge exhaust path in the cartridge.

6. The cryogenically cooled boring tool of claim 5 further comprising:
   a threaded portion on the exhaust transfer tube, wherein the threaded portion is threaded into the tool body.

7. The cryogenically cooled boring tool of claim 4 further comprising:
   a pocket formed in the cartridge for receiving the cutting tool insert and a back wall formed in the pocket; and,
   a channel formed in a bottom face of the cutting tool insert, whereby when the cutting tool insert is mounted in the cartridge, the bottom face of the insert is against the back wall of the pocket, and the channel and the back wall form a coolant cavity to cool the insert.

8. The cryogenically cooled boring tool of claim 7 further comprising:
   a cartridge feed path coupling the feed path in the cartridge to the coolant cavity; and,
   an insert exhaust port formed in the insert and coupling the coolant cavity to the cartridge exhaust path, wherein coolant from the cartridge feed path enters the coolant cavity to cool the insert, and exhaust produced by a boiling-off of cryogen coolant in the coolant cavity is directed through the internal exhaust path to atmosphere.

9. The cryogenically cooled boring tool of claim 8 further comprising:
   at least one exhaust port on the tool body for exhausting cryogenic coolant from the internal exhaust path to atmosphere; and,
   an active cutting edge on the cutting tool insert, wherein the at least one exhaust port is located on the tool body remote from the cutting tool insert so that a distance between the at least one exhaust port and the active cutting edge of the cutting tool insert is greater than the depth of a bore in a workpiece in which the boring tool will be used, whereby the at least one exhaust port remains outside of the bore when the tool body is fully inserted into the bore to maintain an atmospheric air barrier between the exhaust flow from the at least one exhaust port and the workpiece.

10. The cryogenically cooled boring tool of claim 4 wherein the third and fourth insulating tubes comprise tubes of polytetraflourethylene.

11. The cryogenically cooled boring tool of claim 4 wherein the exhaust transfer tubes are formed of metal.

12. The cryogenically cooled boring tool of claim 1 wherein the first and second insulating tubes comprise tubes of polytetraflourethylene.

13. The cryogenically cooled boring tool of claim 1 wherein the feed transfer tubes are formed of metal.

14. The cryogenically cooled boring tool of claim 1 wherein the feed transfer tubes are formed of stainless steel.

* * * * *